United States Patent
Kim

(10) Patent No.: US 8,279,280 B2
(45) Date of Patent: Oct. 2, 2012

(54) LANE DEPARTURE WARNING METHOD AND SYSTEM USING VIRTUAL LANE-DIVIDING LINE

(75) Inventor: Cheol Ho Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 492 days.

(21) Appl. No.: 12/625,946

(22) Filed: Nov. 25, 2009

(65) Prior Publication Data

US 2010/0238283 A1    Sep. 23, 2010

(30) Foreign Application Priority Data

Mar. 18, 2009    (KR) .................. 10-2009-0022943

(51) Int. Cl.
*H04N 7/18* (2006.01)
(52) U.S. Cl. ...................................................... 348/148
(58) Field of Classification Search .................. 348/135, 348/148
See application file for complete search history.

(56) References Cited

U.S. PATENT DOCUMENTS

| | | | |
|---|---|---|---|
| 6,285,393 B1 * | 9/2001 | Shimoura et al. ............. | 348/119 |
| 6,813,370 B1 * | 11/2004 | Arai ............................ | 382/104 |
| 7,307,545 B2 * | 12/2007 | Nishida ........................ | 340/901 |

FOREIGN PATENT DOCUMENTS

| | | |
|---|---|---|
| JP | 2007-183831 A | 7/2007 |
| JP | 2007-188349 A | 7/2007 |

* cited by examiner

*Primary Examiner* — David Czekaj
*Assistant Examiner* — Leron Beck
(74) *Attorney, Agent, or Firm* — Edwards Wildman Palmer LLP; Peter F. Corless

(57) ABSTRACT

The present invention relates to a lane departure warning system and method, which use a virtual lane-dividing line generated using lane width information that is calculated using previously detected lane-dividing lines even when it is difficult to detect a lane-dividing line according to the weather, illuminance, road surface conditions, etc. present during travel of a vehicle, thus allowing a lane departure warning to be provided to a driver on the basis of the virtual lane-dividing line.

11 Claims, 11 Drawing Sheets

DETECTED LANE-　　VIRTUAL LANE-
DIVIDING LINE　　 DIVIDING LINE

VIRTUAL LANE-
DIVIDING LINE
DETECTED LANE-　　　DETECTED LANE-
DIVIDING LINE　　　　DIVIDING LINE

LANE DEPARTURE WARNING METHOD AND SYSTEM USING VIRTUAL LANE-DIVIDING LINE

CROSS-REFERENCE TO RELATED APPLICATIONS

This application claims under 35 U.S.C. §119(a) priority to Korean Application No. 10-2009-0022943, filed on Mar. 18, 2009, the disclosure of which is incorporated herein by reference in its entirety.

BACKGROUND OF THE INVENTION

1. Field of the Invention

The present invention relates, in general, to vehicles, and, more particularly, to a lane departure warning system that is suitably applied to vehicles.

2. Description of the Related Art

Various systems for safe traveling have been developed or applied to recently produced vehicles. For example, one of the systems is a lane departure warning system which suitably provides a warning to a driver when a vehicle deviates from a lane due to his or her careless driving.

The types of lane departure warning systems may be suitably classified into a scheme using a camera preferably located near an inside mirror, a scheme using a rear camera preferably located on the trunk, a lane detection scheme using an optical sensor preferably installed on the bottom of a vehicle, etc. Most lane departure warning systems currently being developed adopt the scheme using a camera that is preferably located near an inside mirror.

Because such a lane departure warning system uses a camera to suitably detect a lane, the performance of lane detection may considerably vary according, for example, to the weather, illuminance, and road surface conditions, etc. that are present during travel of the vehicle. For example, as shown in FIG. 1A, a right lane-dividing line 1 may not be detectable due to dust on the road surface or due to the aging of the lanes in a tunnel or on a national road. Further, as shown in FIG. 1B or 1C, the lane-dividing line 3 of a lane adjacent to an actual driving lane, or the border of a guard rail 5, rather than the lane-dividing line 2 or 4 of the actual driving lane, may be erroneously detected as a lane-dividing line in many cases. Further, for example, as shown in FIG. 1D, in certain examples, a lane-dividing line is hidden by the shadow 6 of a guard rail and cannot be accurately detected.

In conventional technology, deviation from a lane is suitably detected using only a camera with a warning that is suitably provided; however a warning cannot be suitably provided while a vehicle is traveling on a road for which lane-dividing lines are not suitably detectable, and accordingly, since it is not possible to determine whether the detected lane-dividing lines are accurate, subsequently an erroneous warning may be frequently given.

The above information disclosed in this the Background section is only for enhancement of understanding of the background of the invention and therefore it may contain information that does not form the prior art that is already known in this country to a person of ordinary skill in the art.

SUMMARY OF THE INVENTION

In one aspect, the present invention provides a lane departure warning method and system, which have suitably improved performance because a warning is provided by using a predicted virtual lane-dividing line, on the basis of the concept of a virtual lane-dividing line when one of the lane-dividing lines cannot be suitably detected or when a lane-dividing line is erroneously detected.

In accordance with a preferred aspect of the present invention, there is provided a lane departure warning system, preferably comprising a camera unit for suitably generating an image, an image processing unit for suitably generating a detected lane-dividing line from the image, and suitably generating a virtual lane-dividing line when the detected lane-dividing line has not been generated or has been erroneously generated, and a warning unit for giving a suitable warning to a passenger of the vehicle according to a decision that the vehicle is deviating from a driving lane, where the decision is suitably made on the basis of the detected lane-dividing line and the virtual lane-dividing line.

Preferably, the image processing unit may comprise a virtual lane-dividing line generation module for suitably generating the virtual lane-dividing line on an opposite side, suitably spaced apart from one of a left lane-dividing line and a right lane-dividing line by a width of the lane and a lane departure determination module for determining whether the vehicle is deviating from the driving lane, preferably based on one of the detected lane-dividing line and the virtual lane-dividing line.

Preferably, the image processing unit may suitably comprise a lane detection module for generating the detected lane-dividing line from the image, a lane detection determination module for suitably determining whether the detected lane-dividing line has been generated to the satisfaction of preset lane conditions, and a lane width calculation module for suitably calculating the width of the lane using information about the detected lane-dividing line satisfying the preset lane conditions.

Preferably, the lane width calculation module may determine a suitable pitch angle between a road surface and the camera using a vanishing point at which the left lane-dividing line and the right lane-dividing line suitably intersect each other, calculates a per-pixel distance using the pitch angle, and sets the lane width to a value obtained by multiplying the per-pixel distance by a number of pixels corresponding to the lane width.

Preferably, the lane detection determination module may suitably determine whether a lane-dividing line has been detected in consideration of whether the set lane width continues for a reference time or longer, whether both the left lane-dividing line and the right lane-dividing line have been suitably detected, and whether a slope of each detected lane-dividing line is equal to or greater than a reference value.

In accordance with another aspect of the present invention to accomplish the above object, there is preferably provided a lane departure warning method, comprising generating a detected lane-dividing line, determining whether the detected lane-dividing line has been suitably detected to the satisfaction of preset lane conditions, if it is determined that the detected lane-dividing line has not been suitably detected or has been erroneously detected, generating a virtual lane-dividing line on an opposite side spaced apart from one of a left lane-dividing line and a right lane-dividing line by a width of a lane, determining whether a vehicle is deviating from a driving lane, based on one of the detected lane-dividing line and the virtual lane-dividing line, and if it is determined that the vehicle is deviating from the driving lane, generating a suitable warning signal and preferably transmitting the warning signal to a warning unit.

Preferably, the determining whether the lane-dividing line has been suitably detected comprises setting the lane width if it is determined that the lane-dividing line has been suitably detected.

Preferably, the lane width may be set in such a way as to suitably determine a pitch angle between a road surface and a camera using a vanishing point at which the left lane-dividing line and the right lane-dividing line suitably intersect each other, calculate a per-pixel distance using the pitch angle, and set the lane width to a value obtained by multiplying the per-pixel distance by a number of pixels corresponding to the lane width.

Preferably, the determining whether the lane-dividing line has been suitably detected is performed in consideration of whether the set lane width continues for a reference time or longer, whether both the left lane-dividing line and the right lane-dividing line have been suitably detected, and whether a slope of each detected lane-dividing line is equal to or greater than a reference value.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

As described herein, the present invention includes a lane departure warning system of a vehicle, comprising a camera unit for generating an image, an image processing unit; and a warning unit for giving a warning to a passenger of the vehicle according to a decision that the vehicle is deviating from a driving lane.

In one embodiment, the image processing unit is used for generating a detected lane-dividing line from the image, and generating a virtual lane-dividing line when the detected lane-dividing line has not been generated or has been erroneously generated.

In another embodiment, the warning unit gives a warning to a passenger of the vehicle according to a decision that the vehicle is deviating from a driving lane, the decision is made on the basis of the detected lane-dividing line and the virtual lane-dividing line.

The another further embodiments, the image processing unit comprises a virtual lane-dividing line generation module for generating the virtual lane-dividing line on an opposite side spaced apart from one of a left lane-dividing line and a right lane-dividing line by a width of the lane, and a lane departure determination module for determining whether the vehicle is deviating from the driving lane, based on one of the detected lane-dividing line and the virtual lane-dividing line.

The present invention also features a motor vehicle comprising the lane departure warning system as described in any one of the aspects herein.

The present invention also features a lane departure warning method, comprising generating a detected lane-dividing line, determining whether the detected lane-dividing line has been detected to the satisfaction of preset lane conditions, if it is determined that the lane-dividing line has not been detected or has been erroneously detected, generating a virtual lane-dividing line on an opposite side spaced apart from one of a left lane-dividing line and a right lane-dividing line by a width of a lane, determining whether a vehicle is deviating from a driving lane, and if it is determined that the vehicle is deviating from the driving lane, generating a warning signal.

In one embodiment, the step of determining whether a vehicle is deviating from a driving lane is based on one of the detected lane-dividing line and the virtual lane-dividing line.

In a further embodiment, the method comprises, transmitting the warning signal to a warning unit.

The invention also features a lane departure warning system of a vehicle as described in any one of the aspects as described herein.

Hereinafter, certain preferred embodiments of a lane departure warning system for detecting a lane using a camera suitably installed in a vehicle and providing a warning when the vehicle deviates from the lane while traveling according to the present invention will be described in detail with reference to the attached drawings.

Figure 1A:
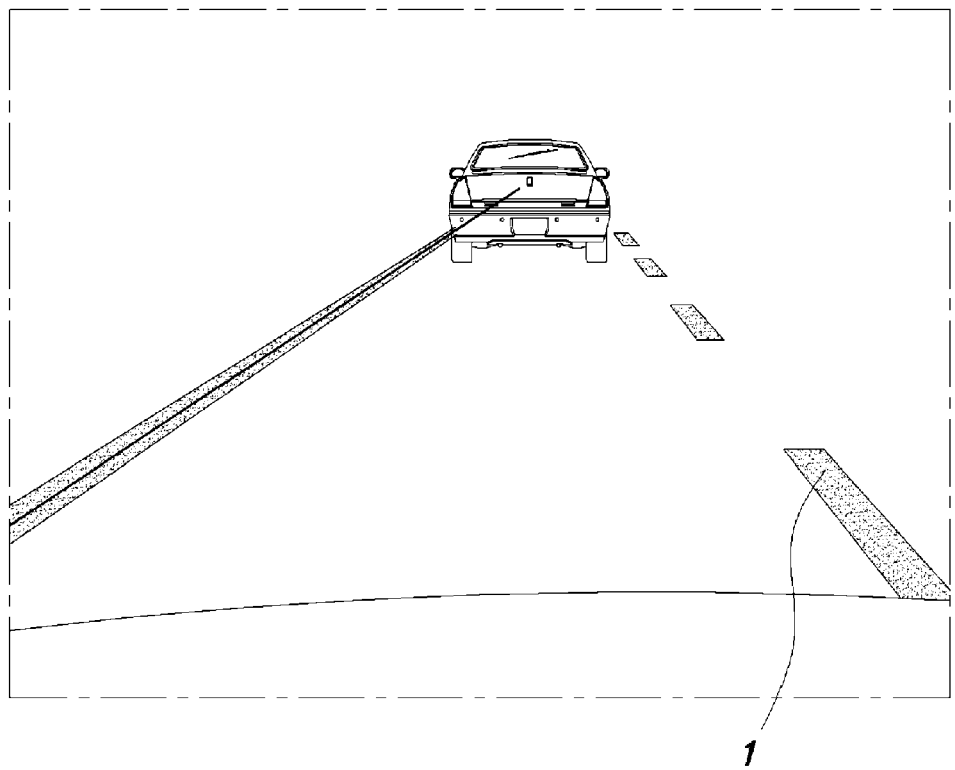
FIGS. 1A to 1D are views showing pictures of detected lane-dividing lines to describe the problems of a conventional method.
Figure 1B:
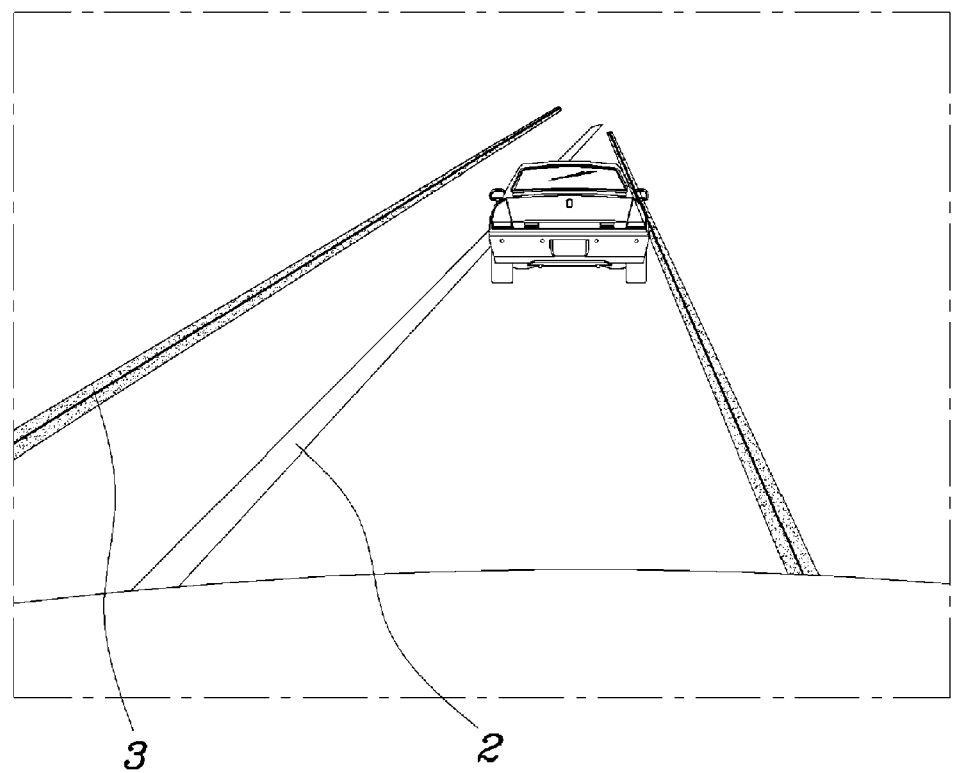
Figure 1C:
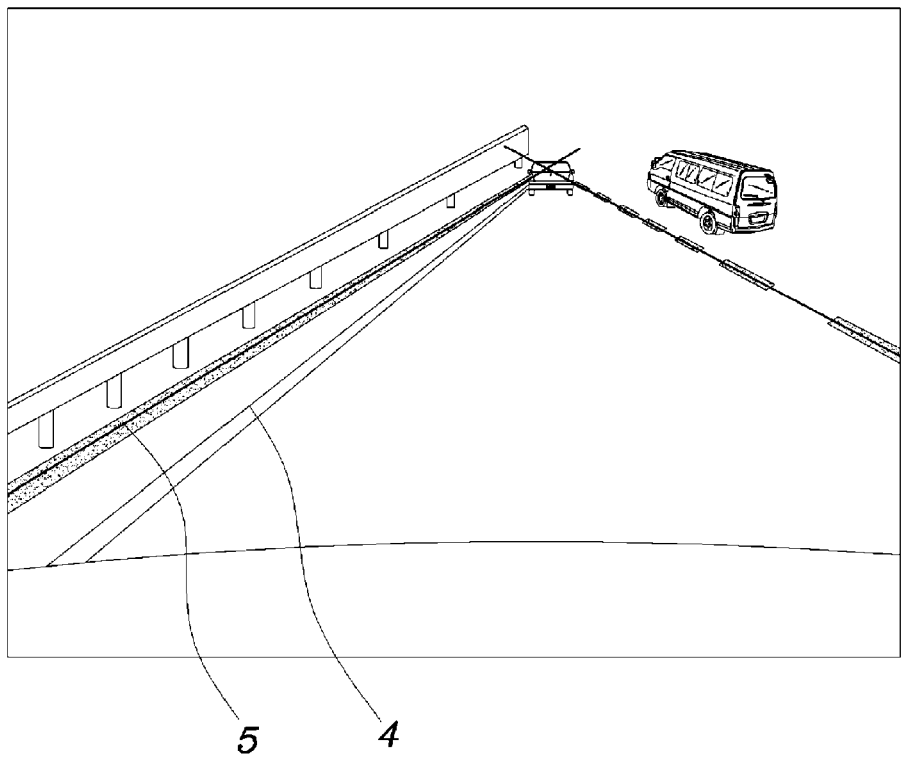
Figure 1D:
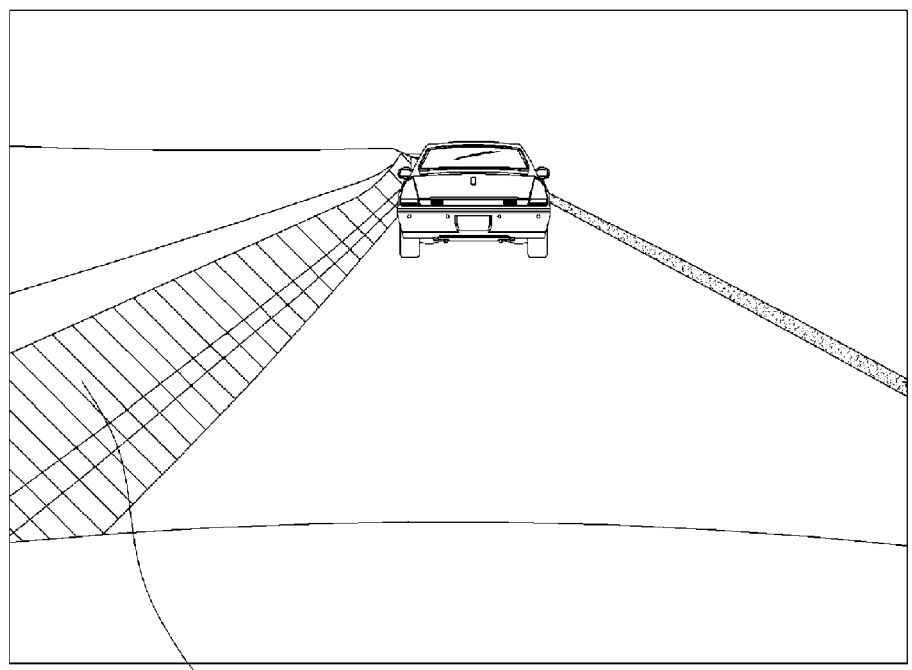
Figure 2:
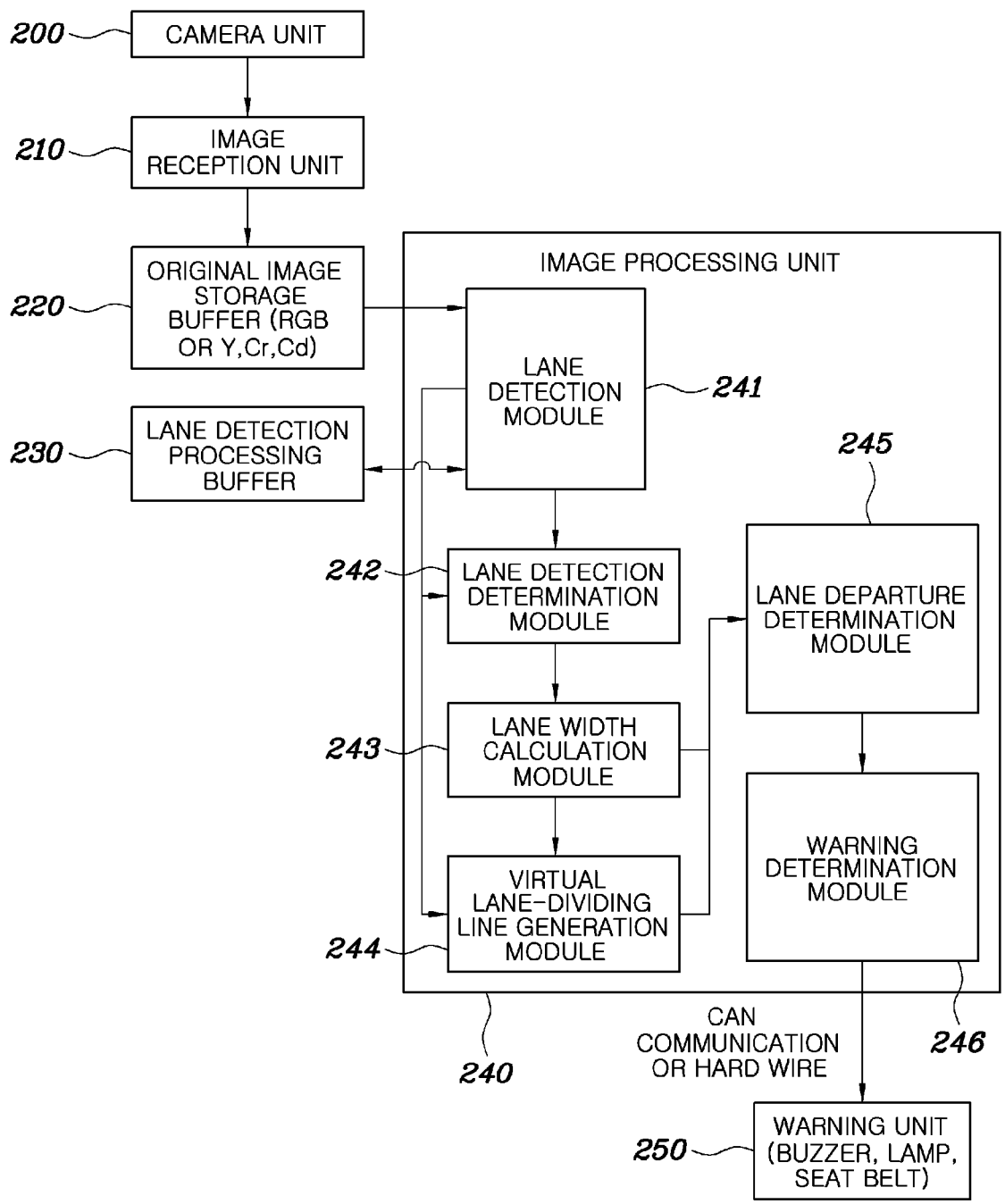
FIG. 2 is a block diagram showing the construction of a lane departure warning system according to a preferred embodiment of the present invention.
Figure 3:
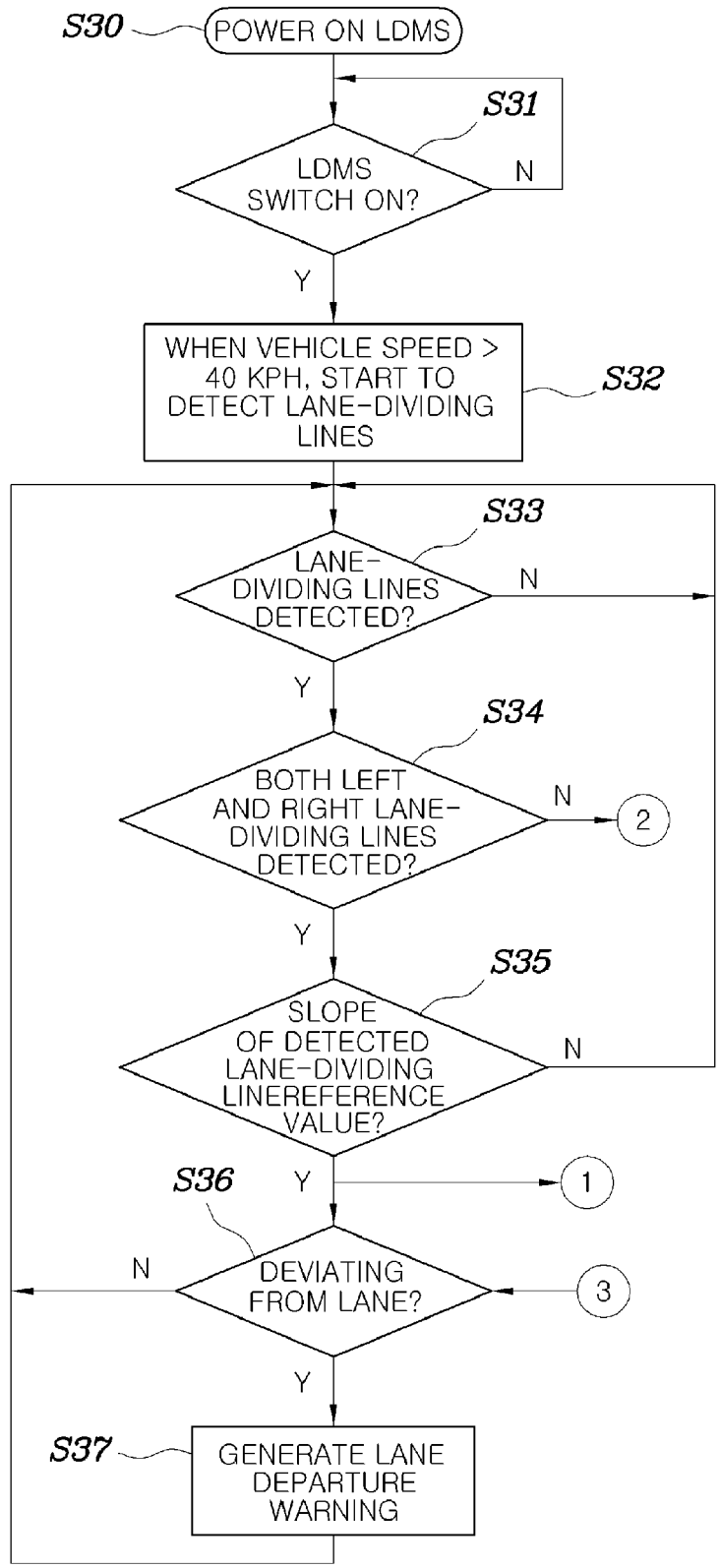
FIG. 3 is a first flowchart of a method performed by a lane departure warning system according to another preferred embodiment of the present invention.
Figure 5:
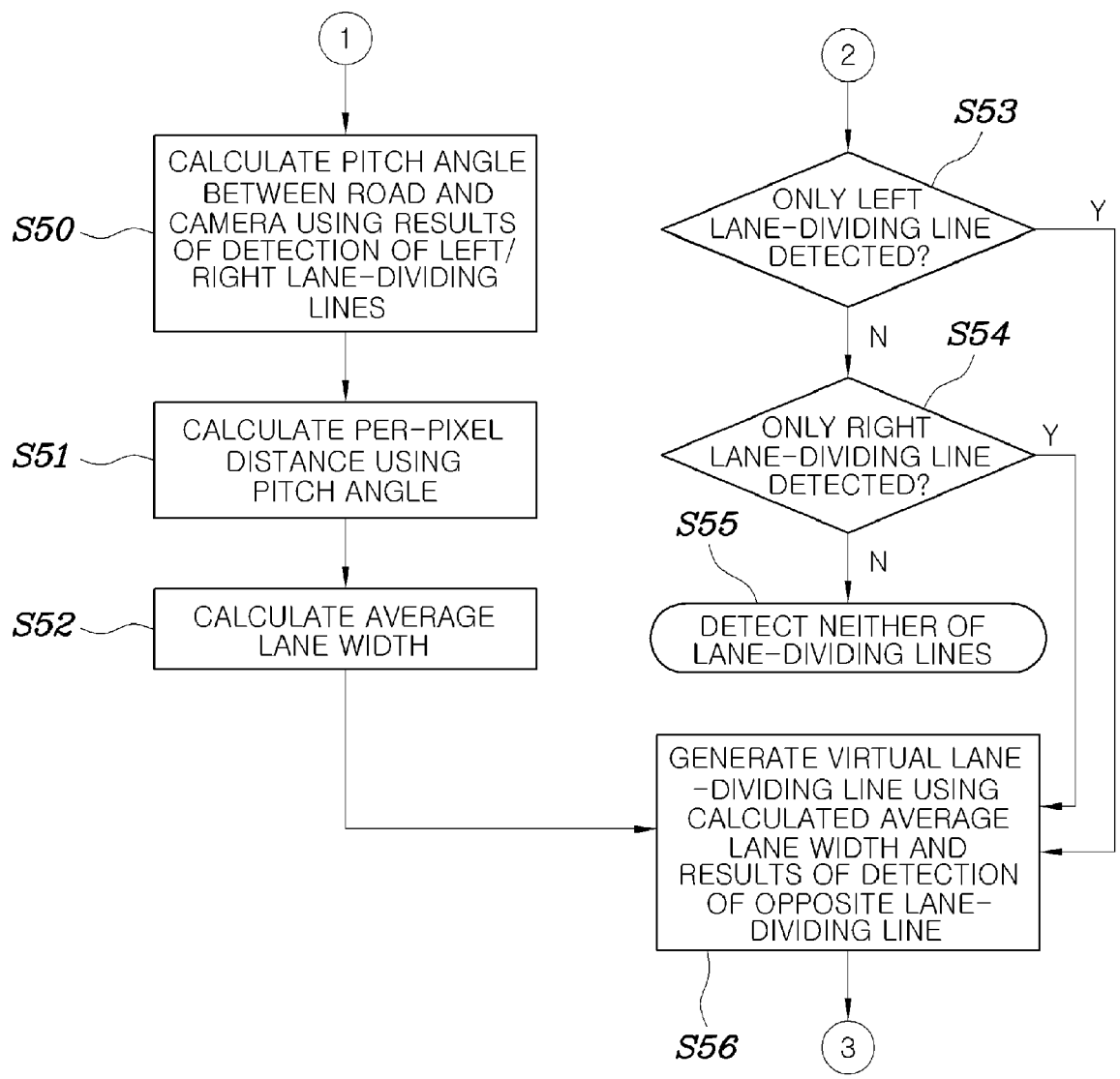
FIG. 5 is a second flowchart of an exemplary method performed by a lane departure warning system according to an embodiment of the present invention.

FIG. 2 is a block diagram showing the construction of a lane departure warning system according to a preferred embodiment of the present invention. Further, FIGS. 3 and 5 are flowcharts showing exemplary methods performed by the lane departure warning system according to preferred embodiments of the present invention.

Referring to FIG. 2, a lane departure warning system according to the present embodiment preferably includes a camera unit 200 and an image processing unit 240. The camera 200 preferably generates an image. In certain preferred embodiments, the image processing unit 240 suitably detects a lane from the image generated by the camera unit 200 during traveling, and suitably transmits a warning signal when a vehicle deviates from the detected lane, but preferably determines whether the vehicle is deviating from a lane by generating a virtual lane-dividing line if the lane-dividing line of the lane is not suitably detectable in the image generated by the camera unit 200 or if a detected lane-dividing line detected from the image does not suitably satisfy preset lane conditions.

In other preferred embodiments, the lane departure warning system may further preferably include an image reception unit 210, an original image storage buffer 220, a lane detection processing buffer 230, and a warning unit 250. In preferred embodiments, the image reception unit 210 receives the image generated by the camera unit 200, and the original image storage buffer 220 suitably stores the original image information of the image from the image reception unit 210 in RGB or YCrCb format. Preferably, the lane detection processing buffer 230 stores information about the lane detected by the image processing unit 240, for example, information about the locations of lane-dividing lines or the width of a lane in the image. The warning unit 250 preferably receives a warning signal from the image processing unit 240 and drives various warning means such as a buzzer, a lamp, a seat belt, etc.

In particular preferred embodiments, the image processing unit 240 according to the present invention preferably includes a lane detection module 241, a lane detection determination module 242, and a lane width calculation module 243. Preferably, the lane detection module 241 suitably detects lane-dividing lines from the image of the camera. In further preferred embodiments, the lane detection determination module 242 determines whether a lane-dividing line has been detected or not, or has been erroneously detected in compliance with lane conditions set based on the results of the detection of the lane-dividing lines by the lane detection module 241, the results of the calculation of lane width, etc. Preferably, the lane width calculation module 243 suitably calculates the lane width using the information about the detected lane-dividing lines detected by the lane detection module 241 and suitably stores information about the lane width in the lane detection processing buffer 230.

In further preferred embodiments, the image processing unit 240 according to the present invention may preferably include a virtual lane-dividing line generation module 244 for suitably generating a virtual lane-dividing line on an opposite side spaced apart from a detected left or right lane-dividing line by the lane width calculated by the lane width calculation module 243 if it is suitably determined by the lane detection determination module 242 that a lane-dividing line has not been suitably detected or has been erroneously detected.

According to further preferred embodiments of the invention, the image processing unit 240 of the present embodiment preferably includes a lane departure determination module 245 for suitably determining whether a relevant vehicle is deviating from a driving lane on the basis of the lane-dividing lines detected by the lane detection module 241, and suitably determining whether the relevant vehicle is suitably deviating from the lane on the basis of the virtual lane-dividing line generated by the virtual lane-dividing line generation module 244 if it is determined by the lane detection determination module 242 that a lane-dividing line has not been detected or has been erroneously detected. Accordingly, in further embodiments of the invention, whether the vehicle is deviating from the driving lane can preferably be accurately determined based on the virtual lane-dividing line even if a lane-dividing line has not been detected or has been erroneously detected from the image of the camera.

In other preferred embodiments, the image processing unit 240 according to the present invention may further include a warning determination module 246 for suitably generating a warning signal in response to the lane departure determination signal received from the lane departure determination module 245 and suitably transmitting the warning signal to the warning unit 250, thus suitably determining the provision of a warning according to the circumstances in consideration of, for example, a multi-function switch signal, a wiper driving signal, etc., as well as the lane departure determination signal at the time of notifying a driver of deviation from the lane using various warning means.

For example, in certain preferred embodiments, the lane departure warning system is a system suitably configured such that the system provides a warning in a situation where a vehicle deviates from a lane without the driver's intention to change lanes, and such that, if deviation from a lane occurs after a turn signal has been applied, the system preferably regards the lane deviation as a normal lane change and does not provide a suitable warning. In further embodiments of the invention as described herein, a drive switch for the lane departure warning system suitably controls the ON/OFF operation of a lane departure warning system function, a multi-function switch suitably controls a turn signal, and a wiper switch suitably restricts the operation of the lane departure warning system unit so as to prevent erroneous warning from occurring due to the repetition of detection/non-detection of lane-dividing lines attributable to a heavy rain. Preferably, a cluster provides information about a reference vehicle speed at which the lane departure warning system is suitably operated, and outputs a warning sound and displays warning indication information in response to a suitable warning signal output from the unit.

In further preferred embodiments, and referring to FIGS. 2 and 3, when power is suitably supplied to the lane departure warning system at step S30, the process proceeds to step S32 at which the lane detection module 241 suitably detects lane-dividing lines from the image of the camera if the lane departure warning system is set to an ON state according to the setting of the switch thereof at step S31. Preferably, at this time, setting may be implemented such that, when the vehicle speed exceeds a certain level, for example, 40 KPH, the detection of lane-dividing lines is suitably started.

In other preferred embodiments, the detection of lane-dividing lines performed by the lane detection module 241 may be regarded as a procedure for suitably extracting lane-dividing lines which form a light portion on the road by preferably applying a filtering algorithm to the input image. In certain preferred embodiments, in order to detect lane-dividing lines, for example, an edge filter, a lane-dividing line highlight filter, etc. may be used. Preferably, the edge filter is suitably configured to detect a portion constituting a boundary in the image using a difference in the brightness values of respective pixels arranged in X and Y directions in an image coordinate system. According to further preferred embodiments, the lane-dividing line highlight filter employs a method of detecting lane-dividing lines by further highlighting brighter lane-dividing lines more than the surrounding brightness using the mean value of brightness values.

In the case of an edge filter, for example, since a plurality of afterimages remains after filtering, in certain cases considerable post-processing is required. In contrast, in certain embodiments, when a lane-dividing line highlight filter is used, preferably, the computational load is suitably reduced compared to the edge filter, thus making the realization of a small size possible. In other certain embodiments of the invention, an advantage of the edge filter versus the lane-dividing line highlight filter is that, even when a left lane-dividing line is suitably present near a guardrail and is covered by a shadow, the lane-dividing line can preferably be clearly detected compared to the lane-dividing line highlight filter. However, according to other further embodiments, neither of the two filters can suitably detect a lane-dividing line when the lane-dividing line is unclear or environment conditions are not suitable.

Preferably, when the final lane-dividing lines are suitably detected using lane-dividing lines extracted using various filtering algorithms, the lane detection module 241 provides information about the lane-dividing lines, for example, the end points of the final lane-dividing lines. According to preferred embodiments of the invention, algorithms used to provide a lane warning may be suitably classified into two methods. In one embodiment, a first method suitably converts information about the detected lane-dividing lines into that of a top view coordinate system and suitably detects deviation from a lane. In another embodiment, a second method suitably provides a warning using only the slopes and intercepts of lane-dividing lines.

Figure 4:
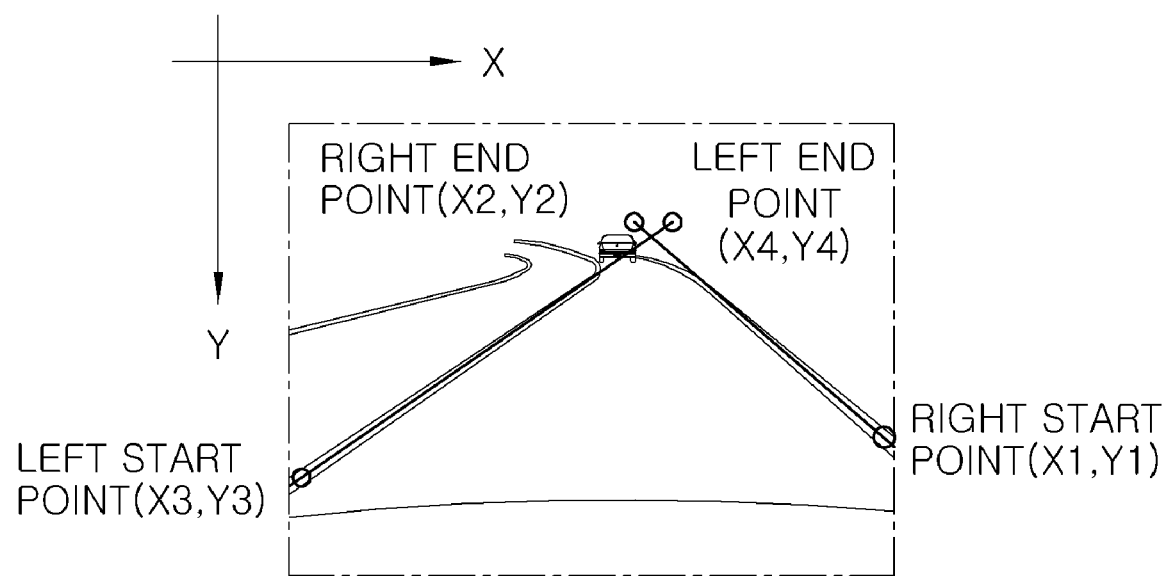
FIG. 4 is a view showing a picture of exemplary detected lane-dividing lines on which coordinates based on the results of lane detection are displayed.

FIG. 4 is a view showing a picture in which coordinates based on the results of lane detection are suitably displayed. The results of lane detection in FIG. 4 are given as the coordinates of two straight lines corresponding to a right lane-dividing line and a left lane-dividing line. According to certain preferred embodiments of the invention, when image coordinates (X, Y) in a two-dimensional (2D) plane are compared to coordinates in a typical X and Y coordinate system, the directions of a Y axis are suitably opposite each other. Further, it can be seen in FIG. 4 that, since the two straight lines intersect each other, the right end point (X2, Y2) and the left end point (X4, Y4) appear in opposite directions. Preferably, the algorithm for performing lane departure warning may be suitably configured to provide a warning in such a way as to obtain the slopes of left/right straight lines using coordinates based on the results of detection of lane-dividing lines, obtain coordinate values, for example, intercept values, at which a Y value is a coordinate value preferably corresponding to the lowermost portion of the frame, for example, at Y=240, from the obtained slopes, and provide a suitable warning when the intercept values fall within a range of warning.

In further embodiments of the present invention, the lane detection determination module 242 performs a procedure for suitably determining whether lane-dividing lines have been detected or not, or have been erroneously detected by the lane detection module 241 at steps S33 to S35. For example, in certain embodiments, whether lane-dividing lines have been detected may be preferably determined in consideration of whether information about a determined lane-dividing line has continuity at step S33, whether both the left lane-dividing line and the right lane-dividing line have been suitably detected at step S34, and whether the slope of each detected lane-dividing line is equal to or greater than a reference value at step S35. Further, in certain embodiments, the case where the lane width suddenly increases in a continuous detection state at step S33 is a case where a lane-dividing line was erroneously detected. According to certain embodiments, this case may be ascertained by, for example, determining whether the lane width continues for a suitable reference time or longer. Further, at step S34, of lane-dividing lines, a lane-dividing line on which serious variation exists in intersections on the left X axis and the right X axis will be suitably labeled an erroneously detected lane-dividing line.

According to other further embodiments, if the lane detection determination module 242 suitably determines that the lane-dividing lines have been detected after performing the lane-dividing line determination procedure at steps S33 to S35, the process preferably proceeds to step S36 at which the lane departure determination module 245 suitably determines whether a traveling vehicle is deviating from the lane on the basis of the determined lane-dividing lines. Then, according to further embodiments, if it is determined that the vehicle is suitably deviating from the lane, the process proceeds to step S37 at which a warning signal indicating deviation from the lane is suitably generated and transmitted to the warning unit 250. At this time, according to further preferred embodiments, it is also possible to determine whether to provide a suitable lane departure warning by combining various types of information based on a wiper driving signal or the like through the warning determination module 246.

In further embodiments, if the lane detection determination module 242 suitably determines that the lane-dividing lines have been detected after performing the lane-dividing line determination procedure at steps S33 to S35, the process preferably proceeds to step S50 of FIG. 5 at which the lane width calculation module 243 suitably calculates a lane width or an average lane width at steps S50 to S52.

Figure 6A:
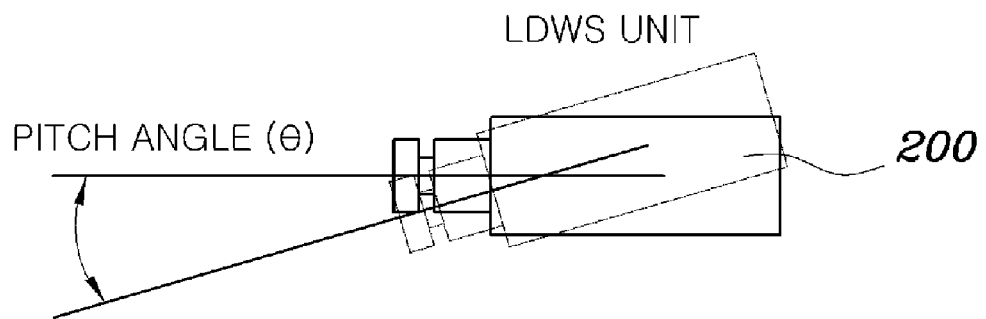
FIGS. 6A and 6B are diagrams showing an exemplary method of determining the pitch angles of a camera using the locations of vanishing points according to an embodiment of the present invention.

Preferably, at step S50, the pitch angle between the road and the camera is suitably calculated using the results of detection of the left and right lane-dividing lines. As shown in FIG. 6A, a vanishing point at which the left and right lane-dividing lines suitably intersect each other is determined according to the pitch angle $\theta$ between the road surface and the camera 200, and a reference value required for the calculation of the lane width changes according to the location of the vanishing point. Accordingly, in further embodiments, when the lane width is calculated, the pitch angle $\theta$ of the camera 200 is preferably considered.

Figure 6B:
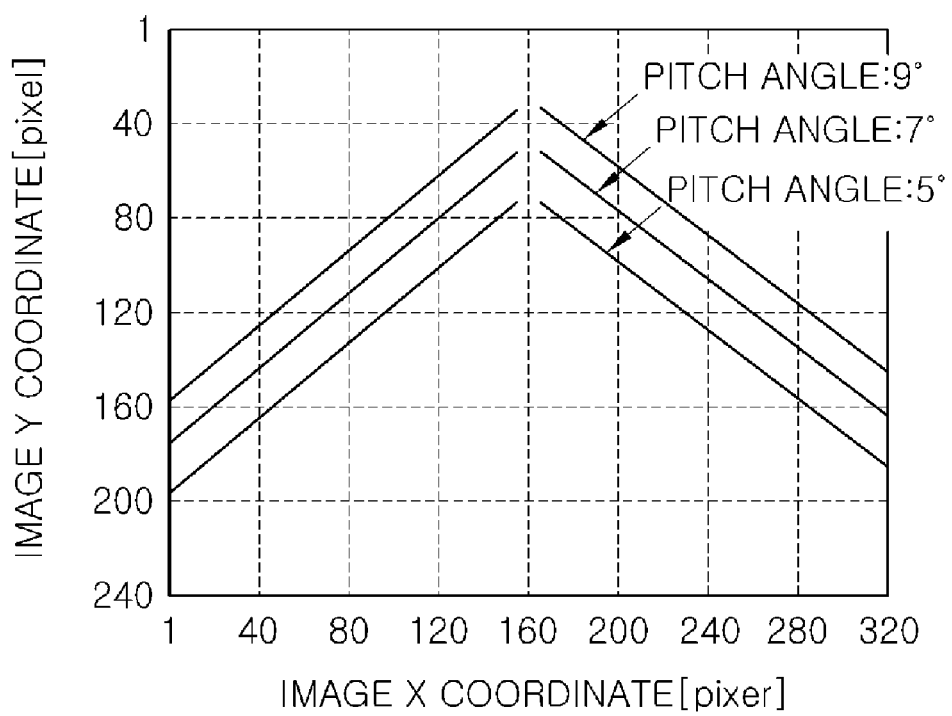

According to other further embodiments, the locations of vanishing points versus pitch angles $\theta$ are suitably configured in the form of a table or function, so that the pitch angles $\theta$ between the road surface and the camera are preferably obtained using the locations of vanishing points, that is, coordinate values, which can be suitably obtained from the results of detection of lane-dividing lines when both lane-dividing lines are suitably detected. In certain exemplary embodiments, it can be seen in FIG. 6B that, when the locations of the vanishing points, especially, the coordinate values of the Y axis, are about 78 pixels, 58 pixels, and 38 pixels, the camera pitch angles $\theta$ may be suitably determined to be 5°, 7°, and 9°, respectively.

Preferably, after each pitch angle $\theta$ is suitably calculated as described above, a per-pixel distance corresponding to the pitch angle $\theta$ is calculated at step S51. According to further preferred embodiments, it can be seen through the results of simulations conducted several times that optimal results are suitably obtained when, for example, a non-linear equation of a quadratic function is used, as shown in Equation (1). However, according to further embodiments, it is apparent that a polynomial function of more than two degrees may be used instead of a quadratic function.

$$\text{per-pixel distance(mm/pixel)} = a\theta^2 + b\theta + c \quad (1)$$

Preferably, in Equation (1), a, b and c are any coefficients and may be suitably set as optimal values having a minimum error, based on the results of various simulations that use a pitch angle $\theta$ as a variable, such as by acquiring a plurality of samples for the pitch angle $\theta$ and a per-pixel distance at that angle.

In further preferred embodiments, at step S52, when the distance information of one pixel on an image coordinate system (per-pixel distance) is multiplied by the difference between the x-intercepts of the left and right lane-dividing lines detected in the lane-diving line detection process, for example, the difference between intersections at Y=240, the width of an actual lane can be suitably obtained.

Preferably, the lane width calculation module 243 according to the present embodiment may suitably determine the pitch angles $\theta$ between the road surface and the camera using vanishing points at which the left and right lane-dividing lines suitably intersect each other, calculate the per-pixel distance using the pitch angles $\theta$, set the lane width to a value, obtained by multiplying the per-pixel distance by the number of pixels corresponding to the lane width, and periodically update this value of the lane width at regular distances.

Figure 7A:
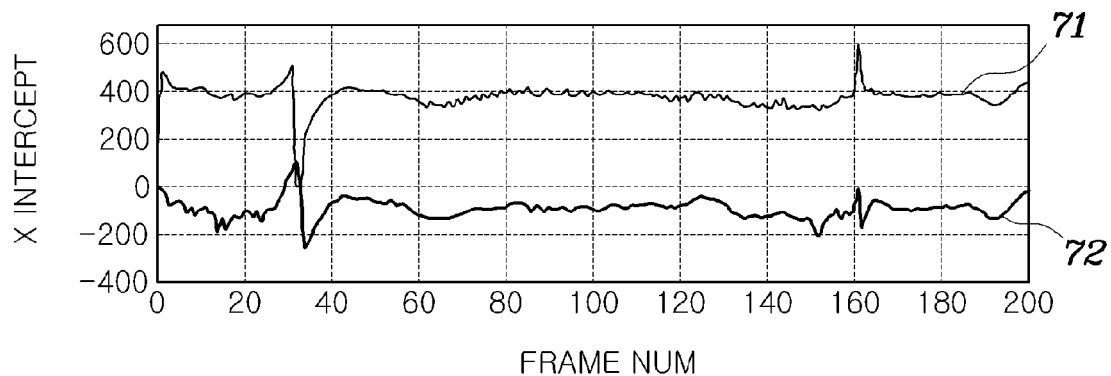
FIGS. 7A and 7B are graphs showing the x-intercepts of lane-dividing lines of a plurality of frames and lane widths corresponding to the x-intercepts.
Figure 7B:
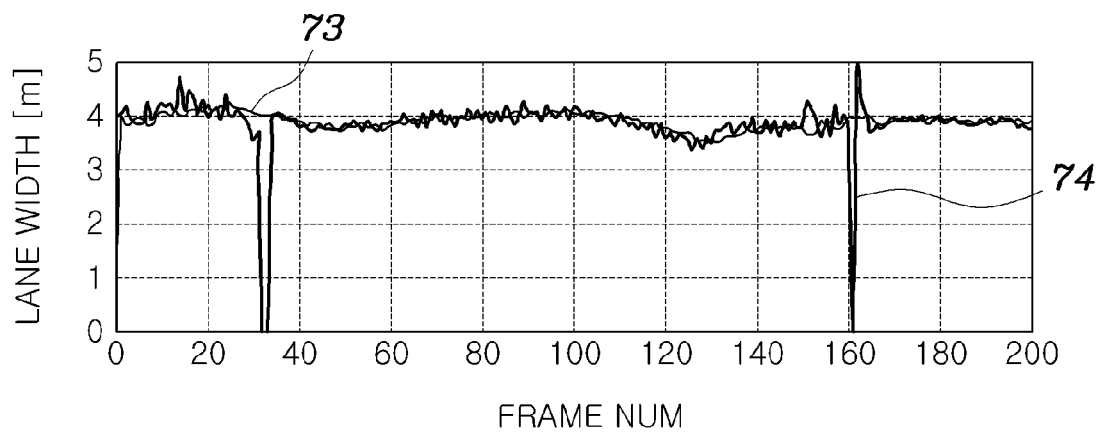

According to further preferred embodiments, and as shown in FIG. 7A, FIG. 7A illustrates variation in the X intercept 71 of a right lane-dividing line suitably obtained through the image of the camera and the x-intercept 72 of a left lane-dividing line, with respect to frames. FIG. 7B illustrates variation in a lane width 73, which is suitably determined by multiplying the difference between the x-intercept 71 of the right lane-dividing line and the x-intercept 72 of the left lane-dividing line by the per-pixel distance suitably determined based on the pitch angles $\theta$, as described above, with respect to frames. According to further embodiments, and as shown in FIGS. 7A and 7B, there is a preferred interval in which variation in values suddenly appears, and such an interval may be preferably regarded as the case where a lane-dividing line is not suitably detected or is erroneously detected.

As described above, in certain preferred embodiments, the lane width, generated by the lane width calculation module 243 by suitably calculating a lane width for each frame at step S52, may be used to subsequently generate a virtual lane-dividing line. Preferably, an average lane width, suitably calculated by applying various average methods to lane widths calculated for a plurality of frames, may be used to suitably generate a virtual lane-dividing line when a lane-dividing line is not detected or is erroneously detected.

According to other further embodiments, when both left and right lane-dividing lines are not suitably detected at step S34, whether only a left lane-dividing line has been detected is determined at step S53 of FIG. 5. If it is not determined that only a left lane-dividing line has been suitably detected, whether only a right lane-dividing line has been suitably detected is determined at step S54. Preferably, if it is not determined that only a right lane-dividing line has been detected, whether neither of the lane-dividing lines has been detected is determined at step S55. Preferably, if it is determined that neither of the lane-dividing lines has been detected, the process is suitably terminated in the state in which lane-dividing lines are not detected. In other further embodiments, when only either the left lane-dividing line or the right lane-dividing line was suitably detected, the process proceeds to step S56 at which the virtual lane-dividing line generation module 244 suitably generates a virtual lane-dividing line on an opposite side spaced apart from the detected left or right lane-dividing line by the lane width. Preferably, as the lane width used for this, the lane width or the average lane width, suitably calculated by the lane width calculation module 243 at steps S50 to S52, is preferably used.

According to further embodiments of the invention, even in the case where all lane-dividing lines are not directly detectable through the image of the camera, whether the vehicle is deviating from the lane while traveling may be suitably determined based on the virtual lane-dividing line, which is generated by the virtual lane-dividing line generation module 244 at step S56 according to the present embodiment, at step S36 of FIG. 3.

According to further embodiments, and as shown in FIGS. 8A and 8B and FIGS. 9A to 9C, FIGS. 8A and 8B and FIGS. 9A to 9C are graphs showing examples of the generation of a virtual lane-dividing line according to embodiments of the present invention.

Figure 8A:
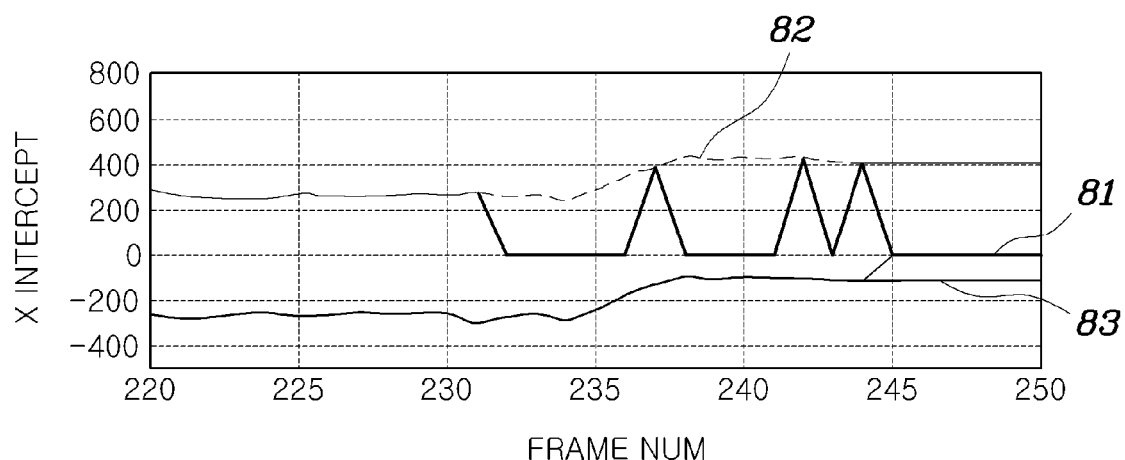
FIGS. 8A and 8B are graphs showing the x-intercepts of lane-dividing lines of a plurality of frames and lane widths corresponding to the x-intercepts according to a preferred embodiment of the present invention.
Figure 8B:
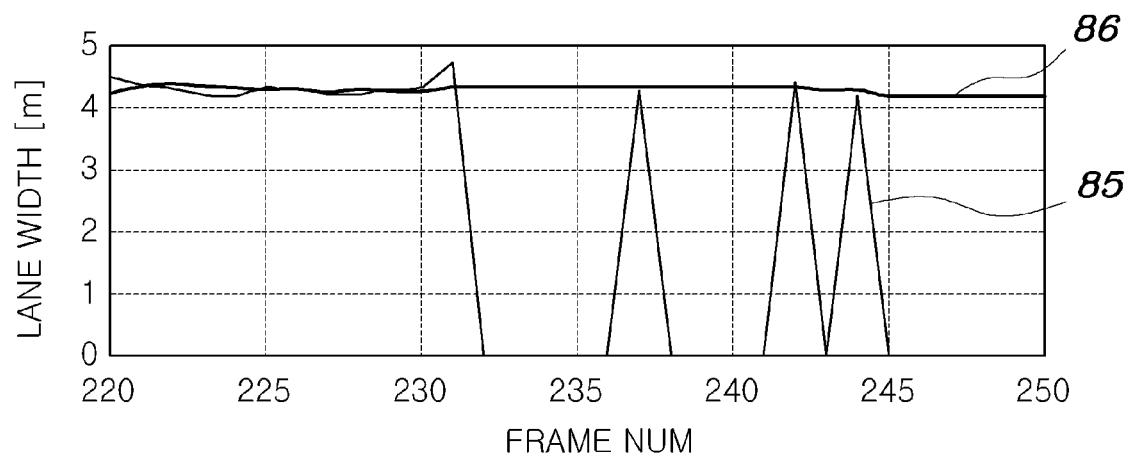

For example, FIG. 8A illustrates variation in the x-intercept 82 of a virtual right lane-dividing line generated according to the preferred embodiments of the present invention, as well as variation in the x-intercept 81 of a right lane-dividing line and the x-intercept 83 of a left lane-dividing line obtained through the image of the camera, with respect to frames. In further embodiments, FIG. 8B illustrates both variation in a lane width 85, actually determined by multiplying the difference between the x-intercept 81 of the right lane-dividing line and the x-intercept 83 of the left lane-dividing line by the per-pixel distance determined based on the pitch angles $\theta$, as described above, and variation in an average lane width 86 calculated using both the results of measurement of the lane width and an average method according to the present embodiment, with respect to frames. Preferably, and as shown in FIGS. 8A and 8B, there is an interval in which suitable variation in values suddenly appears, but it can be seen that such an interval may be regarded as the case where a lane-dividing line is not suitably detected or was erroneously detected, so that the interval is replaced with a virtual lane-dividing line based on the left lane-dividing line and the results of the calculation of the average lane width.

Figure 9A:
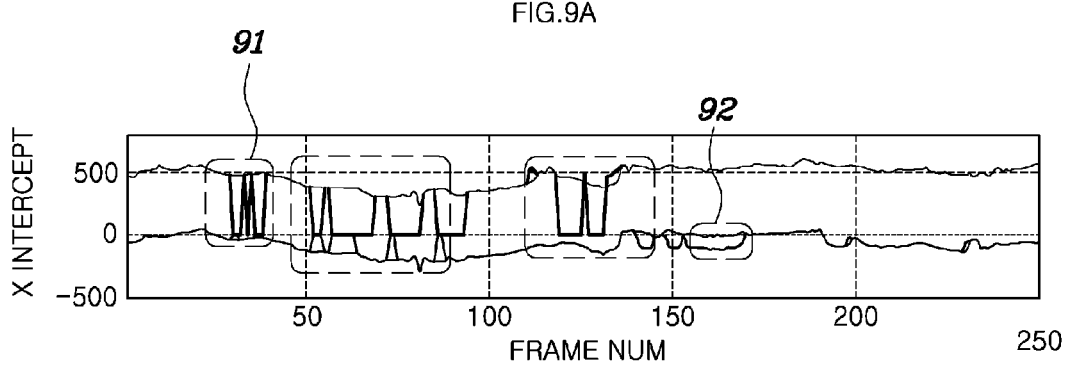
FIGS. 9A to 9C are a graph showing the x-intercepts of lane-dividing lines of a plurality of frames, and views showing pictures of detected lane-dividing lines on which a virtual lane-dividing line is displayed according to another preferred embodiment of the present invention.
Figure 9B:
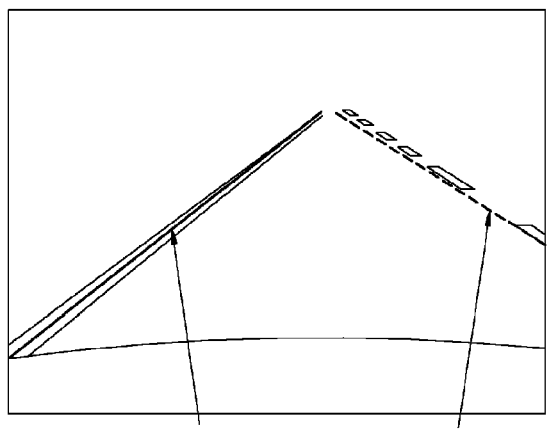
Figure 9C:
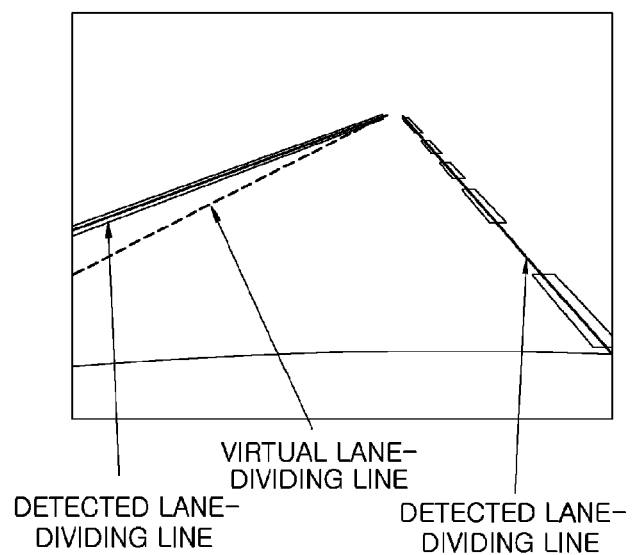

According to further preferred embodiments, FIG. 9A illustrates variation in the x-intercept of a virtual right lane-dividing line generated according to the present invention, as well as variation in the x-intercept of a right lane-dividing line and the x-intercept of a left lane-dividing line suitably obtained through the image of the camera, with respect to frames, similarly to FIG. 8A. FIGS. 9B and 9C illustrate examples in which a virtual lane-dividing line is preferably generated according to preferred embodiments of the present invention as described herein, and is suitably applied to a screen during some intervals in which, for example, variation in x-intercept values suddenly appears and a lane-dividing line is suitably determined to be erroneously detected. For example, as shown in FIGS. 9B and 9C, even if a lane-dividing line is not suitably viewed in an actual image, the lane can be realized in almost the same form as that of the actual lane through the introduction of a virtual lane-dividing line according to preferred embodiments as described herein.

FIG. 9B illustrates a virtual lane-dividing line according to certain preferred embodiments of the present invention that is generated by predicting a lane-dividing line using the concept of an average lane width in the case where a left lane-dividing line on the actual road is suitably detected and a right lane-dividing line is suitably erased and is not detected. It can be seen that the right virtual lane-dividing line is almost coincident with a portion of the erased lane-dividing line. According to further embodiments, as shown for example in FIG. 9C, FIG. 9C illustrates a virtual lane-dividing line that is preferably generated by predicting a lane-dividing line using the concept of an average lane width in the case where a lane-dividing line inside a guardrail on the median strip is erroneously detected as an lane-dividing line.

Figure 10A:
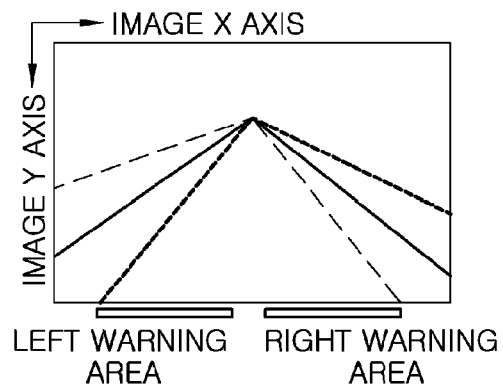
FIGS. 10A to 10C are diagrams showing a lane-departure determination method.
Figure 10B:
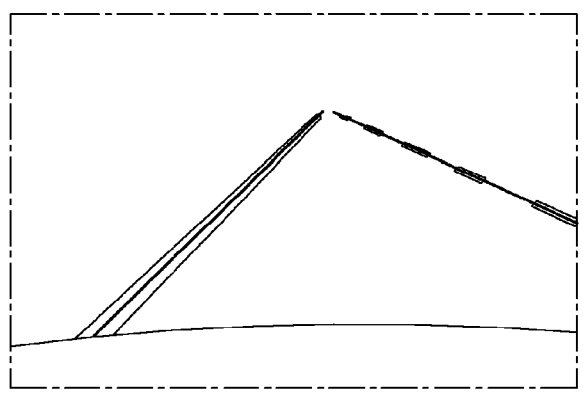
Figure 10C:
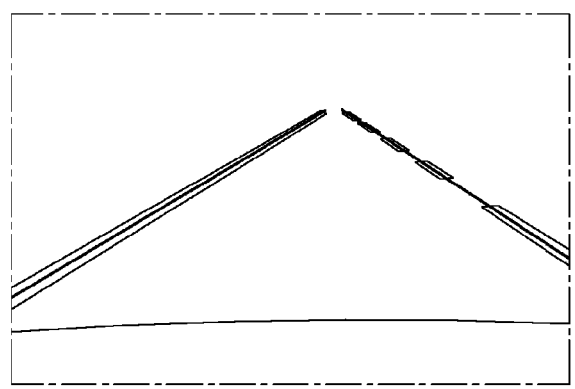

FIGS. 10A to 10C are exemplary diagrams showing a preferred lane departure determination method according to certain embodiments of the present invention.

According to preferred embodiments of the present invention as described herein, when an intercept region obtained by the results of detection of a lane-dividing line is suitably present within warning reference areas, the lane departure determination module 245 is preferably operated to warn a driver of this case in which a vehicle deviates from the lane. Preferably, logic for converting information about the lane-dividing line detected in the image into that of a coordinate area is equally applied. For example, when warning reference areas preferably corresponding to a left warning area and a right warning area are suitably set in the image, as shown in FIG. 10A, and a left lane-dividing line suitably enters the left warning area or a right lane-dividing line suitably enters the right lane-dividing line, for example as shown in FIG. 10B or 10C, this situation is determined to be deviation from a lane, and thus a suitable warning is provided to the driver.

As described above, the present invention provides certain preferred advantages in that, even if it is difficult to detect a lane-dividing line according, for example, to the weather, illuminance, road surface conditions, etc. that are present during travel of a vehicle, a suitable lane departure warning can be provided thanks to a virtual lane-dividing line.

According to certain further embodiments of the invention, there is an advantage in that a virtual lane-dividing line can be suitably generated through the calculation of a lane width.

Furthermore, in other embodiments, there is an advantage in that, when the concept of a virtual lane-dividing line is suitably applied to images of a traveling vehicle and the images are then suitably analyzed, the accuracy of a detection rate for all images can be greatly improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lane departure warning system of a vehicle, comprising:
   a camera unit for generating an image;
   an image processing unit for generating a detected lane-dividing line from the image, and generating a virtual lane-dividing line when the detected lane-dividing line has not been generated or has been erroneously generated; and
   a warning unit for giving a warning to a passenger of the vehicle according to a decision that the vehicle is deviating from a driving lane, the decision is made on the basis of the detected lane-dividing line and the virtual lane-dividing line wherein a lane detection module for generating the detected lane-dividing line from the image; a lane detection determination module for determining whether the detected lane-dividing line has been generated to the satisfaction of preset lane conditions; and a lane width calculation module for calculating the width of the lane using information about the detected lane-dividing line satisfying the preset lane conditions wherein the lane width calculation module determines a pitch angle between a road surface and the camera using a vanishing point at which the left lane-dividing line and the right lane-dividing line intersect each other, calculates a per-pixel distance using the pitch angle, and sets the lane width to a value obtained by multiplying the per-pixel distance by a number of pixels corresponding to the lane width.

2. The lane departure warning system according to claim 1, wherein the image processing unit comprises:
   a virtual lane-dividing line generation module for generating the virtual lane-dividing line on an opposite side spaced apart from one of a left lane-dividing line and a right lane-dividing line by a width of the lane; and
   a lane departure determination module for determining whether the vehicle is deviating from the driving lane, based on one of the detected lane-dividing line and the virtual lane-dividing line.

3. The lane departure warning system according to claim 1, wherein the lane detection determination module determines whether a lane-dividing line has been detected in consideration of whether the set lane width continues for a reference time or longer, whether both the left lane-dividing line and the right lane-dividing line have been detected, and whether a slope of each detected lane-dividing line is equal to or greater than a reference value.

4. A lane departure warning method, comprising:
   generating a detected lane-dividing line;
   determining whether the detected lane-dividing line has been detected to the satisfaction of preset lane conditions;
   if it is determined that the lane-dividing line has not been detected or has been erroneously detected, generating a virtual lane-dividing line on an opposite side spaced apart from one of a left lane-dividing line and a right lane-dividing line by a width of a lane;
   determining whether a vehicle is deviating from a driving lane; and
   if it is determined that the vehicle is deviating from the driving lane, generating a warning signal wherein the determining whether the lane-dividing line has been detected comprises setting the lane width if it is determined that the lane-dividing line has been detected;
   wherein the lane width is set in such a way as to determine a pitch angle between a road surface and a camera using a vanishing point at which the left lane-dividing line and the right lane-dividing line intersect each other, calculate a per-pixel distance using the pitch angle, and set the lane width to a value obtained by multiplying the per-pixel distance by a number of pixels corresponding to the lane width;
   generating by an imaging processing unit in line 2; determining by an imaging processing unit in lines 3 and 9.

5. The lane departure warning method of claim 4, wherein determining whether a vehicle is deviating from a driving lane is based on one of the detected lane-dividing line and the virtual lane-dividing line.

6. The method of claim 4, further comprising transmitting the warning signal to a warning unit.

7. The lane departure warning method according to claim 4, wherein the determining whether the lane-dividing line has been detected is performed in consideration of whether the set lane width continues for a reference time or longer, whether both the left lane-dividing line and the right lane-dividing line have been detected, and whether a slope of each detected lane-dividing line is equal to or greater than a reference value.

8. A lane departure warning system of a vehicle, comprising:

a camera unit for generating an image;

an image processing unit; and a warning unit for giving a warning to a passenger of the vehicle according to a decision that the vehicle is deviating from a driving lane wherein a lane detection module for generating the detected lane-dividing line from the image; a lane detection determination module for determining whether the detected lane-dividing line has been generated to the satisfaction of preset lane conditions; and a lane width calculation module for calculating the width of the lane using information about the detected lane-dividing line satisfying the preset lane conditions;

wherein the lane width calculation module determines a pitch angle between a road surface and the camera using a vanishing point at which the left lane-dividing line and the right lane-dividing line intersect each other, calculates a per-pixel distance using the pitch angle, and sets the lane width to a value obtained by multiplying the per-pixel distance by a number of pixels corresponding to the lane width.

9. The lane departure warning system of a vehicle of claim 8, wherein the image processing unit is used for generating a detected lane-dividing line from the image, and generating a virtual lane-dividing line when the detected lane-dividing line has not been generated or has been erroneously generated.

10. The lane departure warning system of a vehicle of claim 8, wherein the warning unit gives a warning to a passenger of the vehicle according to a decision that the vehicle is deviating from a driving lane, the decision is made on the basis of the detected lane-dividing line and a virtual lane-dividing line.

11. The lane departure warning system according to claim 8, wherein the image processing unit comprises:

a virtual lane-dividing line generation module for generating the virtual lane-dividing line on an opposite side spaced apart from one of a left lane-dividing line and a right lane-dividing line by a width of the lane; and a lane departure determination module for determining whether the vehicle is deviating from the driving lane, based on one of the detected lane-dividing line and the virtual lane-dividing line.

* * * * *